United States Patent [19]
Suzuki et al.

[11] Patent Number: 5,754,897
[45] Date of Patent: May 19, 1998

[54] STROBE CAMERA

[75] Inventors: Tatsuya Suzuki, Tokyo; Yoshiaki Kobayashi, Hachioji; Masami Takase, Hino, all of Japan

[73] Assignee: Olympus Optical Co., Ltd., Tokyo, Japan

[21] Appl. No.: 745,376

[22] Filed: Nov. 8, 1996

[30] Foreign Application Priority Data

Nov. 14, 1995 [JP] Japan .................. 7-295120

[51] Int. Cl.$^6$ .................. G03B 15/03
[52] U.S. Cl. .................. 396/177; 396/163
[58] Field of Search .................. 396/163, 174, 396/175, 176, 177, 178

[56] References Cited

U.S. PATENT DOCUMENTS

| | | | |
|---|---|---|---|
| 4,951,068 | 8/1990 | Ichikawa et al. | 396/178 |
| 5,153,624 | 10/1992 | Haraguchi | 396/177 |
| 5,463,437 | 10/1995 | Takami | 396/177 |

*Primary Examiner*—Daivd M. Gray
*Assistant Examiner*—Nicholas J. Tuccillo
*Attorney, Agent, or Firm*—Frishauf,Holtz, Goodman, Langer & Chick

[57] ABSTRACT

A strobe camera with a strobe emission section movable between a first position in which strobe light can be emitted and a second position different from the first position. A strobe state detection unit outputs a first strobe state signal when the strobe emission section is in the first position, and a second strobe state signal when the strobe emission section is in the second position. A camera state detection unit outputs a first camera state signal when the camera is in a photographing-permitted state, and a second camera state signal when the camera is in a photographing-prohibited position. A control unit causes the camera to execute a warning operation when the camera state detection unit outputs the first camera state signal and the strobe state detection unit outputs the second strobe state signal, and causes the camera to stop execution of the warning operation and perform an exposure operation when the first strobe state signal is output instead of the second strobe stage signal.

17 Claims, 7 Drawing Sheets

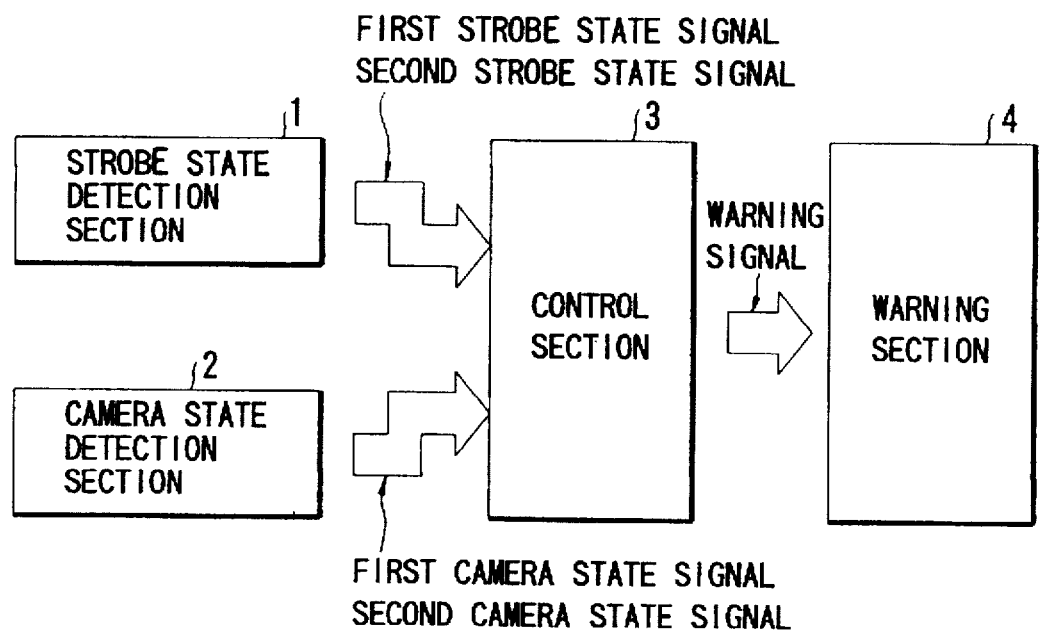
F I G. 1
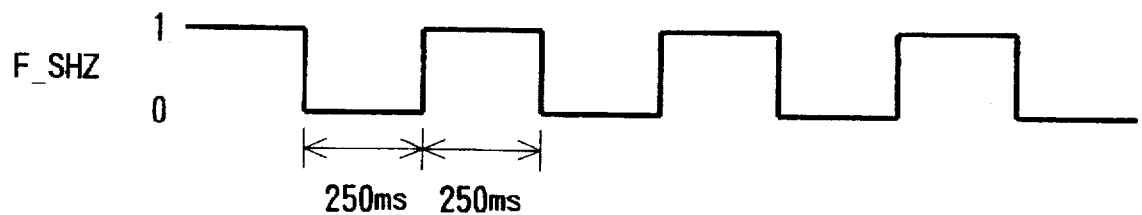
F I G. 5

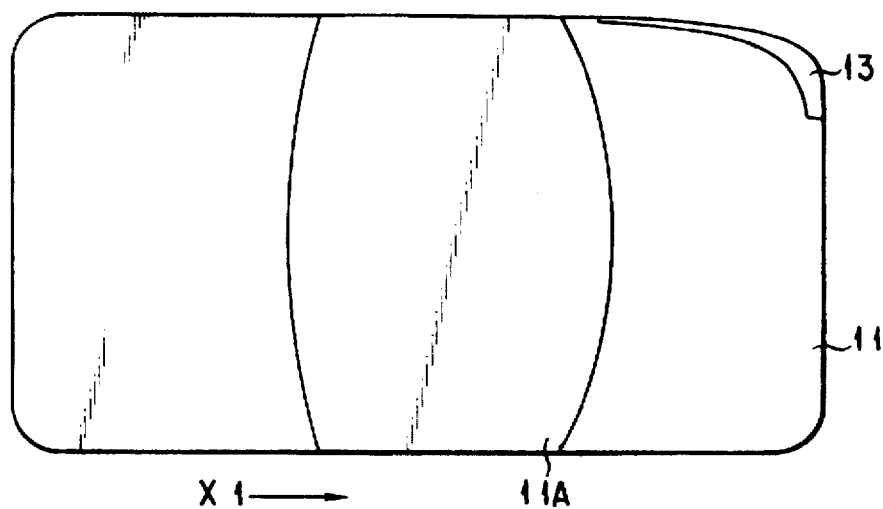
F I G. 2A
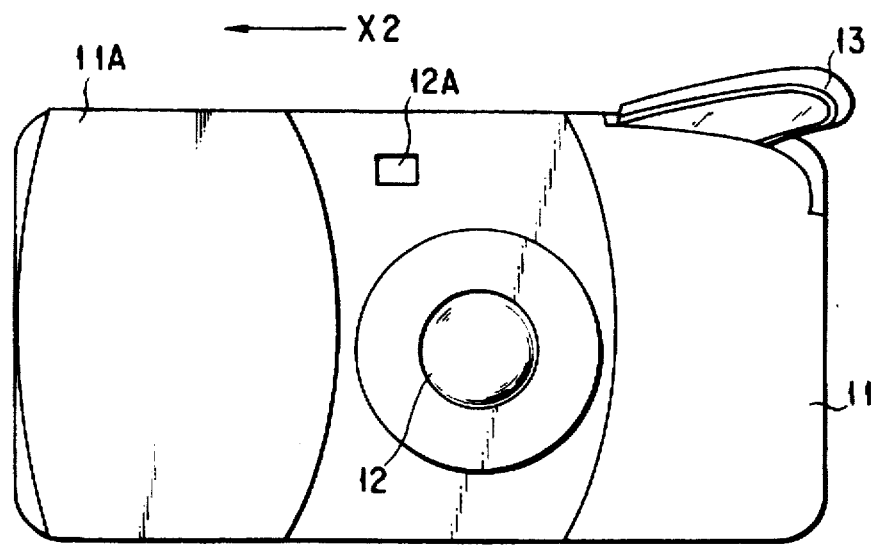
F I G. 2B

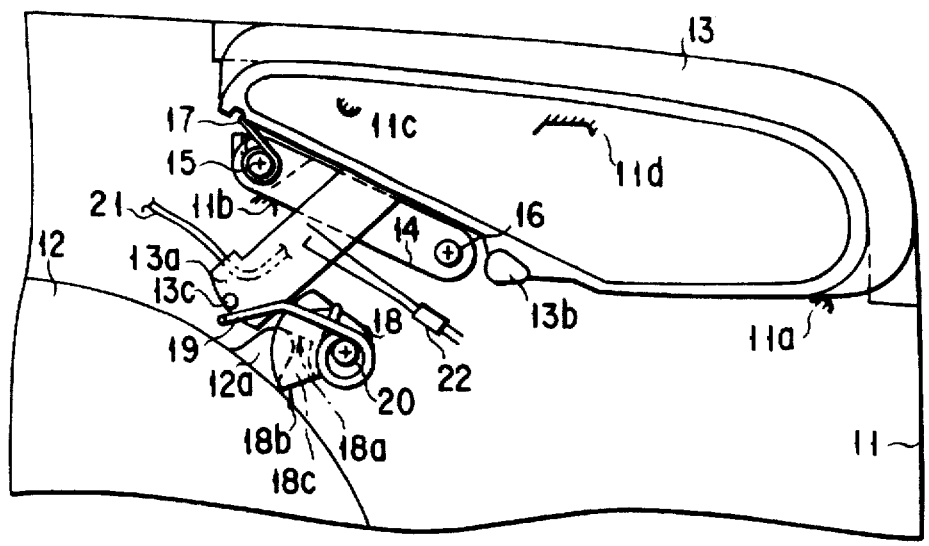
F I G. 3A
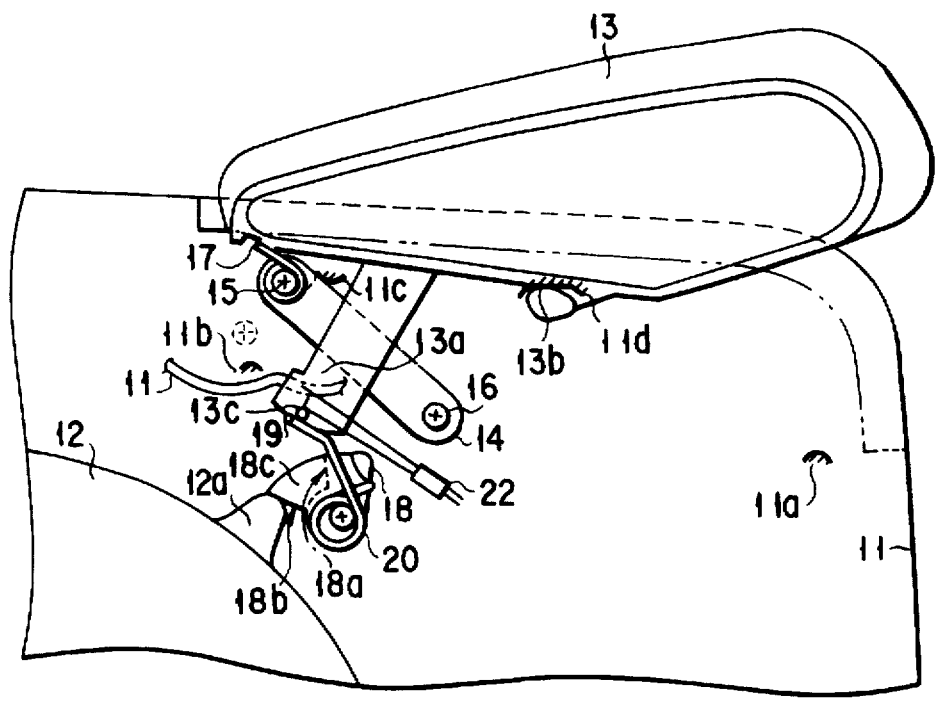
F I G. 3B

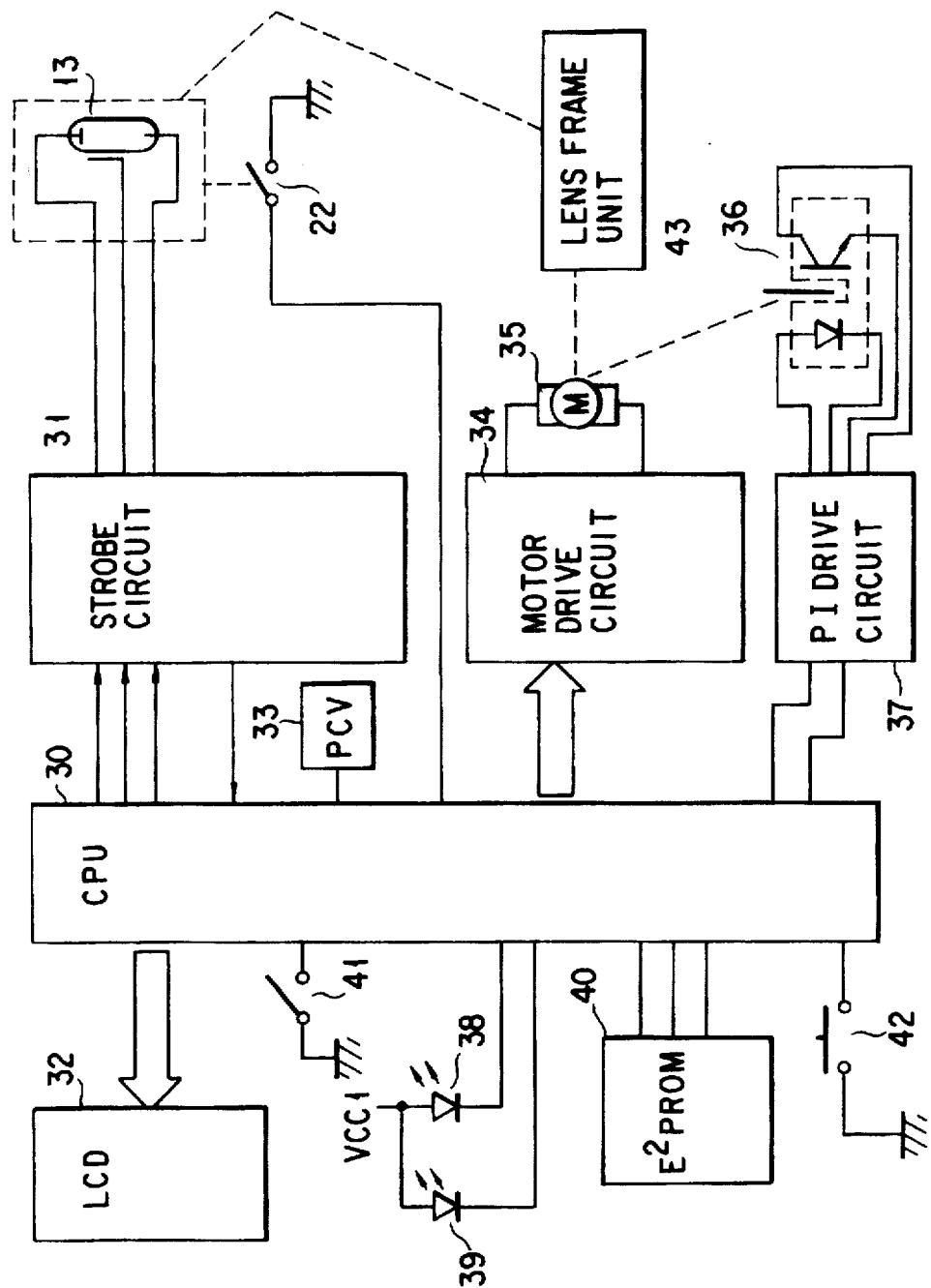
F I G. 4

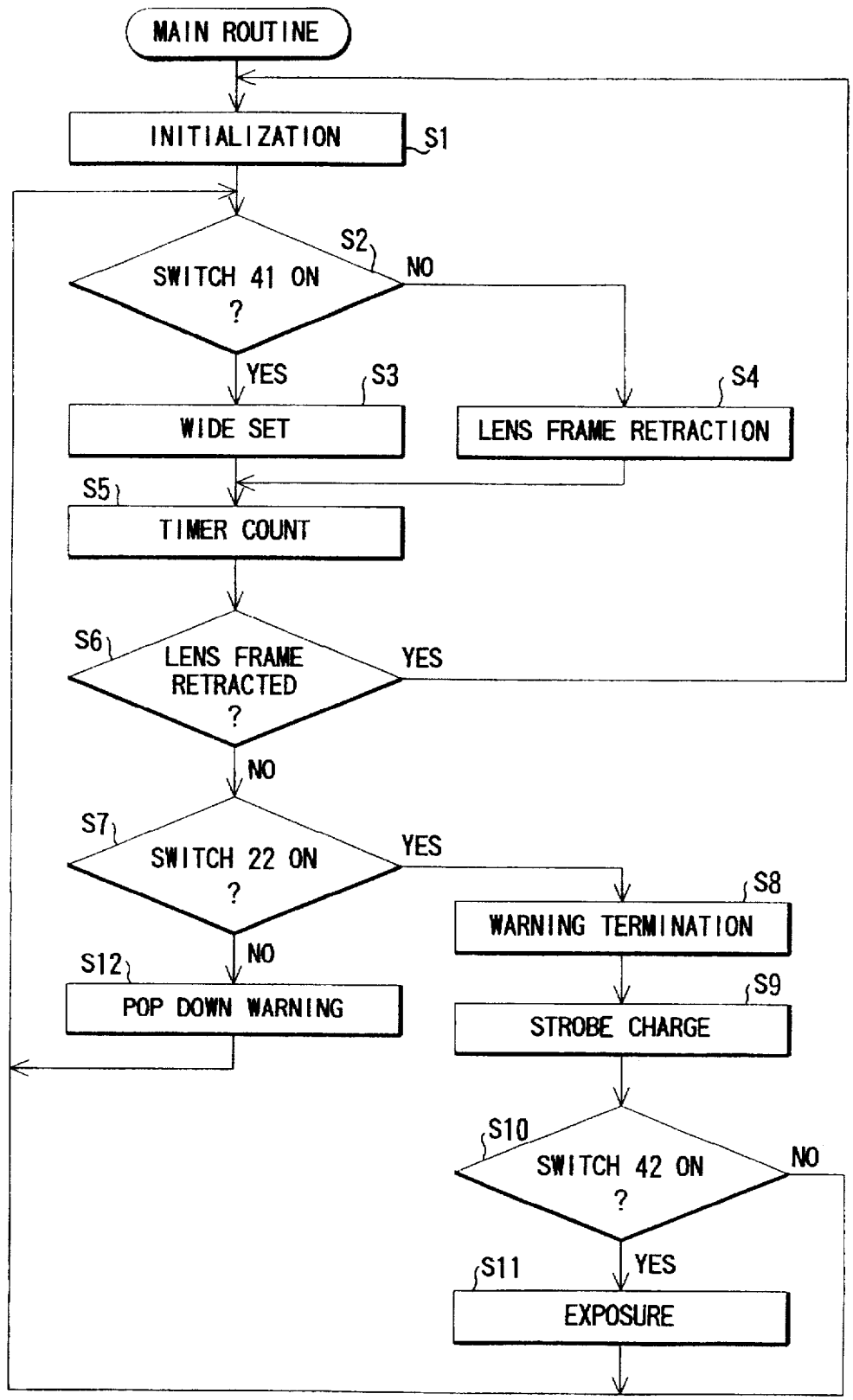
F I G. 6

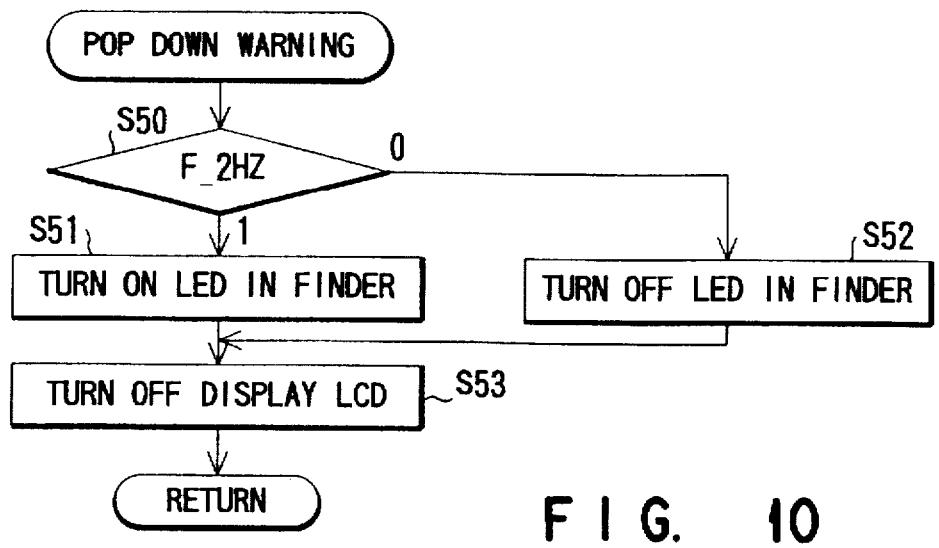
F I G. 10
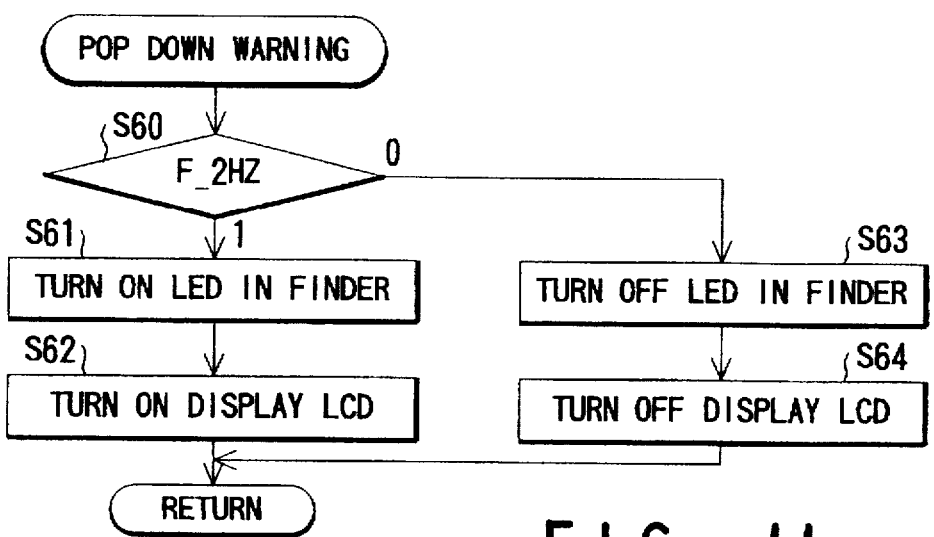
F I G. 11
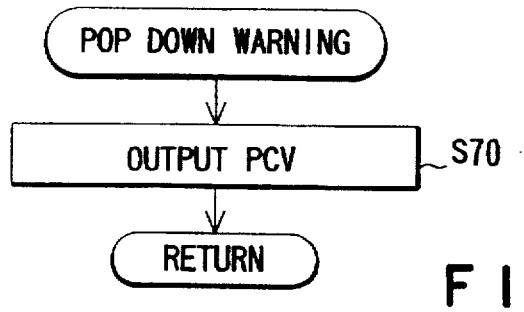
F I G. 12

STROBE CAMERA

BACKGROUND OF THE INVENTION

1. Field of the Invention

This invention relates to a strobe camera with a strobe emission section which is movable between a light emission position and a storage position.

2. Description of the Related Art

Japanese Patent Application No. 4-272478, for example, has proposed a camera with a strobe emission section. In this camera, the camera state is set to a release lock state in which its lens is stored in the camera body when the strobe emission section is manually pushed into the camera body, and is set to a photographing-permitted state when one of the switches other than a release switch is turned on.

Further, a technique for setting a strobe off mode and continuing a sequence of operation when the strobe emission section is pushed into the camera body has also been proposed.

However, even if, in the above-described techniques, the strobe emission section is unintentionally pushed down, the lens is stored, and accordingly a chance to take a good photograph may well be lost.

In addition, if the sequential operation is continued in the strobe off mode, it is highly possible that a blurred photograph will be taken, since the strobe off mode is kept even where strobe light is required.

SUMMARY OF THE INVENTION

The invention has been developed in light of the above, and aims to provide a strobe camera capable of enabling a chance to take a clear photograph without a blur, even when a strobe emission section is unintentionally pushed into the camera body.

According to a first aspect of the invention, there is provided a strobe camera with a strobe emission section movable between a first position in which strobe light can be emitted and a second position different from the first position, comprising: strobe state detection means for outputting a first strobe state signal when the strobe emission section is in the first position, and a second strobe state signal when the strobe emission section is in the second position; camera state detection means for outputting a first camera state signal when the camera is in a photographing-permitted state, and a second camera state signal when the camera is in a photographing-prohibited position; control means for outputting a warning signal when the camera state detection means outputs the first camera state signal, and the strobe state detection means outputs the second strobe state signal; and warning means for performing warning when the warning signal is output.

According to a second aspect of the invention, there is provided a strobe camera with a strobe emission section movable between a position in which strobe light can be emitted and a storage position in which the strobe emission section is stored in a body of the camera, comprising: strobe state detection section for outputting a strobe storage state signal indicating that the strobe emission section is stored in the body of the camera, when the strobe emission section is in the storage position; camera state detection section for outputting a photographing-permitted-state signal when the camera is in a photographing-permitted state; control section for outputting a warning signal when the camera state detection section outputs the photographing-permitted state signal, and the strobe storage state detection section outputs the strobe storage state signal; and warning section for performing warning when the warning signal is output.

According to a third aspect of the invention, where is provided a camera comprising: operable means for setting the camera to an operable state; a strobe unit for emitting illumination light to a target; drive means for moving at least emission part incorporated in the strobe unit, between a light emission position in which light can be emitted from the emission part and a storage position in which the at least emission part is stored in a body of the camera; detection means for detecting whether or not the emission part is in the light emission position; warning means for displaying a warning signal; and a microcomputer for inputting data from the operable means and the detection means to control the strobe unit, the drive means and the waning means, the microcomputer causing the warning means to display the warning signal, when the operable means sets the camera to an operable state and the detection means detects that the emission part is not in the light emission position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram, showing a strobe camera according to a first embodiment of the invention;

FIG. 2A is a front view, showing the state of the strobe camera of the first embodiment, assumed when a strobe emission section incorporated therein is closed;

FIG. 2B is a front view, showing the state of the strobe camera of the first embodiment, assumed when the strobe emission section is open;

FIG. 3A is a sectional view, showing the state of the strobe camera of the first embodiment, assumed when the strobe emission section is closed;

FIG. 3B is a front view, showing the state of the strobe camera of the first embodiment, assumed when the strobe emission section is open;

FIG. 4 is a block diagram, showing a strobe camera according to a second embodiment of the invention;

FIG. 5 is a view, useful in explaining a flag F_2 Hz;

FIG. 6 is a flowchart, useful in explaining a main sequence of operation performed by the camera of the second embodiment;

FIG. 10 is a flowchart, useful in explaining a sequence of "pop-down alarm" operation as a furthermore subroutine executed in a step S12 of FIG. 6;

FIG. 11 is a flowchart, useful in explaining a sequence of "pop-down alarm" operation as a yet another subroutine executed in a step S12 of FIG. 6; and FIG. 12 is a flowchart, useful in explaining a sequence of "pop-down alarm" operation as another subroutine executed in a step S12 of FIG. 6.

DETAILED DESCRIPTION OF THE PREFERRED EMBODIMENTS

Figure 7:
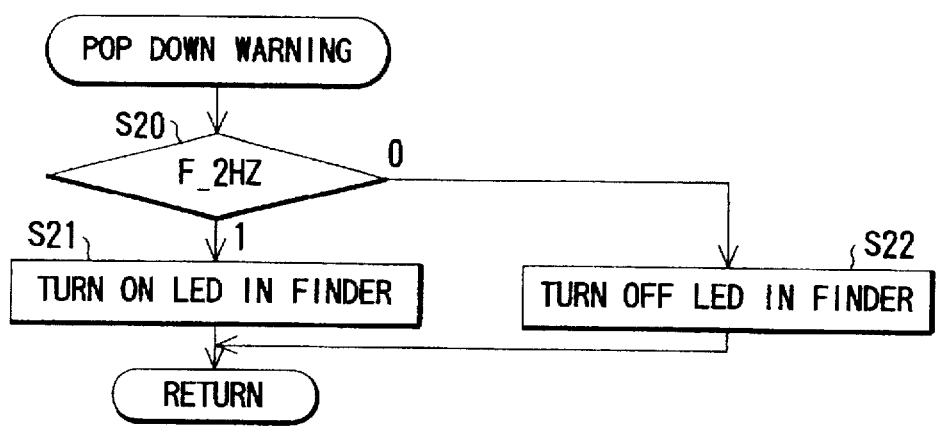
FIG. 7 is a flowchart, useful in explaining a sequence of "pop-down alarm" operation as a subroutine executed in a step S12 of FIG. 6.

The embodiments of the invention will be described in detail with reference to the accompanying drawings.

Referring first to FIG. 1, a strobe camera according to a first embodiment of the invention will be described. In FIG. 1, a strobe state detecting section 1 detects whether or not a strobe emission section (not shown) incorporated in the camera is in a light emission enable state in which it can emit light. The strobe state detecting section 1 supplies a control section 3 with a first strobe state signal when the strobe emission section is in the light emission enable state, and with a second strobe state signal when the strobe emission section is stored in the camera. A camera state detecting section 2 detects whether or not the camera is in a photographing-enable state in which the camera can photograph a target. The section 2 supplies the control section 3 with a first camera state signal when the camera is in the photographing-enable state, and with a second camera state signal when the camera is in a photographing-disable state in which it cannot photograph a target. Thus, the control section 3 receives the first and second strobe state signals and the first and second camera state signals. When the control section 3 receives both the first camera state signal and the second strobe state signal, it outputs an alarm signal to an alarm section 4 to drive it.

FIGS. 2A and 2B are front views of the strobe camera of the first embodiment, showing in detail a driving mechanism incorporated in the camera for moving a (strobe) flash emission section. Specifically, FIG. 2A shows a case where the flash emission section is in a storage position, while FIG. 2B shows a case where the flash emission section is in a protrusion position.

As is shown in FIGS. 2A and 2B, a barrier member 11A is provided on the front side of a camera body 11. While the camera is carried or stored, i.e. while the camera is not used, the barrier member 11A is situated in a position shown in FIG. 2A, thereby protecting the front side of the camera body 11. On the other hand, at the time of photographing an object, i.e. at the time of using the camera, the barrier member 11A is slided in a direction indicated by the arrow X2 in FIG. 2B, thereby turning on the power switch of the camera and opening a photographing optical system 12, a finder section 12A, etc. serving as photographing means and provided on the front side of the camera body 11. Thus, the camera is shifted to a photographing preparation state.

The photographing optical system 12 comprises a mirror frame holding a photographing lens. In the state shown in FIG. 2A in which the camera is not used, the optical system 12 receives an OFF signal from a power switch 41 (see FIG. 4) which operates in synchronism with the barrier member 11A, thereby performing a lens-retracting operation (a photographing-prohibiting operation) and shifting to a lens-retracted state (a photographing-prohibited state). On the other hand, in the state shown in FIG. 2B in which the camera is used, the optical system 12 receives an ON signal from the power switch 41, thereby performing a lens-protruding operation (a photographing-permitting operation) and shifting to a lens-protruded state (a photographing-permitted state).

A flash emission section 13 is supported by an upper end portion of the camera body 11 such that it can move between a protrusion position and a storage position. In the state shown in FIG. 2A in which the camera is not used, the flash emission section 13 is shifted to the storage position in which it is stored in the camera body 11.

On the other hand, in the state shown in FIG. 2B in which the camera is used, the flash emission section 13 is moved to the protrusion position and protrudes from the upper end portion of the camera body 11. In this embodiment, the flash emission section 13 is formed of a general strobe unit or a flash emission unit, which is constituted, for example, by an Xe discharge tube, a reflector, a window member, etc. Therefore, no detailed explanation will be given of the flash emission section 13.

FIGS. 3A and 3B are enlarged sectional views, showing the internal structure of the driving mechanism for moving the flash emission section. Specifically, FIG. 3A shows a case corresponding to FIG. 2A where the flash emission section is in the storage position, while FIG. 3B shows a case corresponding to FIG. 2B where the flash emission section is in the protrusion position.

As described above, the flash emission section 13 is supported by the camera body 11 such that it is movable between the protrusion position and the storage position. Referring then to FIGS. 3A and 3B, the structure of the section 13 will be described in detail.

As is shown in FIGS. 3A and 3B, the flash emission section 13 has an end thereof movably coupled, by means of a shaft 15, with an end portion of a coupling member 14. Thus, the flash emission section 13 is movably supported. The shaft 15 is engaged with a closing spring 17 as urging means which always urges the flash emission section 13 toward the storage position. In other words, the spring 17 urges the flash emission section 13 toward the coupling member 14.

A shaft 16 is provided at the other end of the coupling member 14, thereby attaching the coupling member 14 to a fixing member (not shown) of the camera body 11 such that the member 14 can rotate relative to the fixing member.

A drive lever 18 is rotatably supported by a fixing member (not shown) such that it is engaged with the flash emission section 13 to move the same. Further, the drive lever 18 has cam surfaces 18a and 18b parallel to the optical axis, and a cam surface 18c formed of an inclined surface which connects the cam surfaces 18a and 18b to each other.

The lens frame of the photographing optical system 12 has a projecting portion 12a on its outer peripheral surface portion. The projecting portion 12a is brought into contact with the cam surface 18c of the drive lever 18 and presses it when the lens frame of the system 12 retracts or protrudes (i.e. when the lens frame linearly moves along the optical axis), thereby rotating the drive lever 18.

The drive lever 18 has an elastic opening spring 19, which is engaged with an arm portion 13a provided at an end of the flash emission section 13. By virtue of this structure, the flash emission section 13 is stored in the camera body 11 in synchronism with the photographing-prohibiting operation of the lens frame, and is protruded from the camera body 11 against the urging force of the closing spring 17 in synchronism with the photographing-permitting operation of the lens frame.

The arm portion 13a of the flash emission section 13 contains an electric wire 21, such as a lead wire, which is connected to the flash emission section 13. Where the flash emission section 13 is in the storage position, a predetermined clearance is defined between the opening spring 19 and the arm portion 13a of the flash emission section 13, thereby releasing the urging force of the opening spring 19 so that the urging force will not adversely affect the flash emission section 13 situated in the storage position.

That force of the opening spring 19 as the elastic member, which is applied to the arm portion 13b when they contact each other, is set greater than the maximum urging force of the closing spring 17 as the urging means.

The camera body 11 contains position limit members 11d and 11a as emission section limit means for limiting the angular movement of the flash emission section 13 between the protrusion position and the storage position, and position limit members 11b and 11c as coupling member limit means for limiting the angular movement of the coupling member 14 between positions corresponding to the protrusion position and the storage position.

A detection switch 22 as detection means for detecting whether the flash emission section 13 is in the protrusion position or in the storage position is provided in the camera body 11. The switch 22 is situated in the vicinity of the flash emission section 13 when the section 13 is stored in the camera body 11. Moreover, a projection 13c is provided at an end of the arm portion 13a of the flash emission section 13. The projection 13c moves in accordance with the movement of the flash emission section 13, thereby turning on or off the detection switch 22.

The contact of the detection switch 22 has its position adjusted so that the switch can be turned on or off when the operator of the camera pushes the flash emission section 13.

The driving mechanism of the flash emission section incorporated in the strobe camera of the first embodiment constructed as above will now be described.

First, the moving operation of the flash emission section 13 incorporated in the first embodiment will be described briefly. Where the section 13 is in the storage position in the camera body 11 (i.e. where it is in the state shown in FIGS. 2A and 3A), if the power switch, etc. is turned on in accordance, for example, with sliding of the barrier member 11A in its opening direction, the flash emission section 13 is shifted to the state shown in FIGS. 2B and 3B.

To shift the flash emission section 13 from the storage position to the protrusion position, a first operation and a second operation are successively performed. Specifically, first, in the first operation, only the coupling member 14 is moved from the position limited by the position limit member 11b to the position limited by the position limit member 11c, with the flash emission section 13 kept in the storage position limited by the position limit member 11a. Then, in the second operation, only the flash emission section 13 is shifted from the storage position to the protrusion position limited by the position limit member 11d, with the coupling member 14 kept in the position limited by the position limit member 11c.

In the state shown in FIGS. 2A and 3A, the projection 12a on the lens frame of the photographing optical system 12 is in contact with the cam surface 18a of the drive lever 18, thereby prohibiting the rotation of the drive lever 18.

At this time, the flash emission section 13 is urged clockwise (in FIG. 3A) about the shaft 15 by the closing spring 17, i.e. the section 13 is always urged toward the storage position. Further, the section 13 is in contact with the position limit member 11a as the emission section limit means, and kept in the storage position. Thus, the limit member 11a prevents the flash emission section 13 from entering a more inner portion of the camera body 11.

On the other hand, the coupling member 14 is urged counterclockwise (in FIG. 3A) about the shaft 16 by the closing spring 17 via the flash emission section 13. At this time, the coupling member 14 is in contact with the position limit member 11b as the coupling member limit means, and its further rotation is prevented by the limit member 11b. As a result, the flash emission section 13 is accurately situated in the storage position in the camera body 11.

Even if the flash emission section 13 is forcibly pulled out of the camera body 11, for example, by the hand of the operator, i.e. even if the section 13 is protruded from the camera body 11 against the urging force of the closing spring 17, no load will be applied to the components of the camera other than the closing spring 17. This means that the internal mechanism of the camera and/or the components of the driving mechanism of the section 13 will not be damaged. When the pulling force is released, the flash emission section 13 is returned to the storage position by the urging force of the closing spring 17.

Referring then to FIGS. 2B and 3B, the case where the flash emission section 13 is situated in the protrusion position will be described.

When the barrier member 11A is slid in the direction indicated by the arrow X2 in FIG. 2B, the photographing optical system 12 is opened, and the lens frame of the system 12 is protruded in accordance with the opening operation of the optical system.

After the lens frame of the optical system 12 is protruded, the projection 12a on the frame is brought into contact with the cam surface 18c of the drive lever 18. Further, in accordance with the linear movement of the lens frame of the optical system 12 along the optical axis, the drive lever 18 rotates clockwise about the shaft 20 until it is put into contact with the cam surface 18b as shown in FIG. 3B. Since as aforementioned, that force of the opening spring 19, which is applied to the arm portion 13b when they contact each other, is set greater than the maximum urging force of the closing spring 17, the drive lever 18 rotates clockwise from the position shown in FIG. 3A.

In accordance with the clockwise rotation of the drive lever 18, the spring 19 of the lever 18 contacts the arm portion 13a, and pushes up the arm portion 13a. The flash emission section 13 rotates counterclockwise about the shaft 15 from the position shown in FIG. 3A against the urging force of the closing spring 17. As a result, the projection 13b of the flash emission section 13 is put into contact with the position limit member 11d as the emission section limit means, and the flash emission section 13 is set in the protrusion position.

On the other hand, the coupling member 14 is rotated clockwise about the shaft 16 from the position shown in FIG. 3A, put into contact with the position limit member 11c as the coupling member limit means, and set in a position corresponding to the protrusion position of the flash emission section 13. As a result, the flash emission section 13 protrudes from the camera body 11.

When the lens frame of the optical system 12 has completely been protruded, the drive lever 18 has been rotated by the projection 12a and is situated in the position shown in FIG. 3B. As a result, the opening spring 19 is put into contact with the projection 13c and hence loaded.

If the section 13, which is in the protrusion position, is forced into the camera body 11, the opening spring 19 is further loaded. In this state, however, no load is applied to the inner components of the camera other than the spring 19.

Therefore, each element of the inner mechanism of the camera or that of the driving mechanism of the flash emission section 13 is protected. Further, if the force exerted upon the flash emission section 13 to force it into the camera body is released, the flash emission section 13 is returned to the protrusion position by the loaded opening spring 19.

If the lens frame of the optical system 12 is tried to protrude, with the flash emission section 13 kept in the storage position by the hand of the operator, the flash emission section 13 performs the above-described sequence of operations. In other words, the projection 12a on the lens frame is put into contact with the cam surface 18c of the drive lever 18, with the result that the drive lever 18 is rotated and the arm portion 13a of the flash emission section 13 is urged by the opening spring 19. In this state, however, the flash emission section 13 is forced not to protrude, and accordingly the opening spring 19 is loaded.

Since, thus, load is applied only to the opening spring 19, each element of the camera inner mechanism or that of the driving mechanism of the flash emission section 13 is prevented from being damaged.

If the force applied to the flash emission section 13 by the hand, etc. so as not to protrude is released after the lens frame is completely protruded, the flash emission section 13 is shifted to the protrusion position by the loaded opening spring 19.

Where the flash emission section 13 is in the storage position, the detection switch 22 is in the off-state as shown in FIG. 3A, and the control means determines that the flash emission section 13 is in the storage position. Then, the control means prohibits the flash emission section 13 from emitting light. On the other hand, where the flash emission section 13 is in the protrusion position, the detection switch 22 is in the on-state as shown in FIG. 3B.

When the flash emission section 13 is shifted from the storage position to the protrusion position, the projection 13c of the arm portion 13a of the section 13 is moved accordingly, thereby pressing the detection switch 22. As a result, the detection switch 22 is turned on in synchronism with the shift of the flash emission section 13 to the protrusion position.

Upon receiving a signal indicative of the on-state from the detection switch 22, the control means determines that the flash emission section 13 is in the protrusion state, and permits the section 13 to emit light.

Although in the first embodiment, the flash emission section 13 is supported by an end portion of the camera body 11, the flash emission section 13 may be supported, for example, by an enclosure member provided on the camera. Moreover, although the flash emission section 13 is moved in synchronism with the movement of the lens frame of the optical system 12 along the optical axis (i.e. in synchronism with the operation to protrude the lens frame), a similar advantage can be obtained by rotating the drive lever 18 in synchronism with the rotation of e.g. a helicoid, a cam ling, etc. generally used for the lens frame.

In addition, a similar result can be obtained by modifying the embodiment such that another switch, etc. for lighting the flash emission section 13 is employed to synchronize the shift of the section 13 between the protrusion position and the storage position, with the on/off signal of the switch, or to synchronize the barrier member 11A with the drive lever 18. In the latter case, the drive lever 18 as the emission section driving means is made to also serve as barrier opening/closing means.

Furthermore, a similar result can be obtained by providing, on a camera enclosure member, a handling member for manually handling the drive lever 18, and shifting the flash emission section 13 between the protrusion position and the storage position by directly handling the lever 18 with the handling member.

Although in the first embodiment, the flash emission section 13 is shifted between the protrusion position and the storage position by rotating the drive lever 18, the shift of the section 13 may be performed by sliding the drive lever 18.

Moreover, although in the first embodiment, the position limit members 11a and 11b as the emission section limit means and the position limit members 11b and 11c as the coupling member limit means are arranged in the camera body 11 with the flash emission section and the coupling member 14 interposed therebetween, they may be interposed between the camera body 11 and the flash emission section 13 or between the camera body 11, the flash emission section 13 and the shaft 15.

Although the positions of the flash emission section 13 and the coupling member 14 are limited by the position limit members 11a and 11b as the emission section limit means and the position limit members 11b and 11c as the coupling member limit means, the relative positions of the camera body 11 and the coupling member 14 and those of the flash emission section 13 and the coupling member 14 may be limited, respectively.

The positions of the opening spring as the elastic means and the closing spring as the urging means may be exchanged with each other, thereby urging the flash emission section 13 toward the storage position in synchronism with the retracting/protruding operation of the lens frame of the photographing optical system 12.

Although the on/off operation of the detection switch 22 is performed in synchronism with the shift of the flash emission section 13, the same result can be obtained by synchronizing the on/off operation of the switch 22 with the movement of the coupling member 14 or the opening spring 19.

Also, the arm portion 13a of the flash emission section 13 may be engaged with another member (not shown) via the opening spring 19. Similarly, the detection switch 22 may be pressed by another member (not shown) via the opening spring 19.

Referring then to FIG. 4, a strobe camera according to a second embodiment of the invention will be described. In FIG. 4, a CPU 30 controls the overall sequence of operations of the camera. The CPU 30 is connected to an LCD 32 as an external liquid crystal display for displaying photography data. An LED 38 and an LED 39 are arranged in the finder of the camera. The LED 38 displays a focusing state of an automatic focusing device (not shown), while the LED 39 displays a charged state of a strobe emission capacitor (not shown) which is charged by a strobe circuit 31.

The CPU 30 is connected to an E²PROM 40, which stores various adjustment values, camera states to be used for controlling a sequence of mechanism driving operations, AE operations, AF operations, etc. A switch 42 is a release switch. When the switch 42 is in the on-state, a distance to a target or the intensity of light is measured to thereby control a shutter unit (not shown) and perform exposure.

A PCV 33 is a voice unit for performing various types of warning. A switch 41 is an operable switch for making the CPU 30 recognize the on/off state of the power supply. When the switch 41 is in the on-state, the CPU 30 drives a motor drive circuit 34 to supply current to a motor 35 and move a lens frame unit 43.

The rotational speed of the motor 35 is converted to an electric signal by a PI 36, and further to pulses by a PI drive circuit 37, and then input to the CPU 30. Thus, the operation of the motor 35 is fed back, thereby shifting the state of the lens frame unit from the retracted state to the photographing standby state. At this time, as described above, the flash emission section 13 is shifted to the emission-permitted position, and the switch 22 is turned on to thereby make the CPU 30 recognize the shift of the section 13.

Referring now to the flowchart of FIG. 6, a main sequence of operations of the strobe camera according to the second embodiment will be described.

First, the CPU 30 initializes the camera. Specifically, RAM flags, etc. are initialized, and data stored in the E²PROM 40 is read and stored in the RAM of the CPU 30 (step S1).

Then, the CPU 30 detects the state of the switch 41 (step S2). If the switch is in the on-state, the program proceeds to a step S3, where the CPU 30 executes a "wide-set operation" to shift the lens frame unit 43 to the photographing standby state. Since the "wide-set operation" does not directly relate to the subject matter of the present invention, no detailed explanation is given thereof.

On the other hand, if the switch is in the off-state, the program proceeds to a step S4, where a retracting operation is performed for retracting the lens frame unit 43 which is in the photographing standby state. No detailed explanation is given to the retracting operation, too. The switch is turned on when the "wide-set operation" is performed, and turned off when the retracting operation is performed.

Subsequently, the CPU 30 counts time for controlling the time required for the overall main sequence of operations, and sets a flag F_2 Hz, which will be described later (step S5). Thereafter, the CPU 30 determines whether or not the lens frame unit is retracted (step S6).

If the camera is in the lens-frame-retracted state, the program returns to the step S1. The operations in the steps S1–S6 are repeated until the answer to the question in the step S2 becomes NO and the wide-set operation is executed. If, on the other hand, the camera is not in the lens-frame-retracted state, it is determined that the camera is in the photographing standby state, and the program proceeds to a step S7.

In the step S7, it is determined whether or not the switch 22 is in the on-state. If the switch 22 is in the on-state, it is determined that the flash emission section 13 is in the emission-permitted position, and the camera is in the photographing standby state. Since this means that the camera is in a normal state, the program proceeds to a step S8.

If the switch 22 is in the off-state, it is determined that the flash emission section 13 is in the storage state although the camera is in the photographing standby state, and hence that the flash emission section 13 is in an abnormal state. The program proceeds to a step S12, where a subroutine "pop-down warning" is executed for warning that the flash emission section 13 is abnormal. Then, the program returns to the step S2, thereby repeating the processing until the switch 22 is again turned on or until the switch 41 is turned off to shift the camera state to the storage state.

When it is determined in the step S7 that the switch 22 is turned on, the CPU 30 terminates the pop down warning executed in the step S12, thereby driving the strobe circuit 31 and charging the emission capacitor (not shown) (step S9). Subsequently, the CPU 30 determines the state of the switch 42 (step S10). If the switch 42 is in the on-state, an exposure operation is executed in a step S11, whereas if the switch 42 is in the off-state, the exposure operation is not executed and the program returns to the step S12, thereby repeating the processing until the switch 42 is turned on.

Referring to FIG. 5, the flag F_2 Hz set during the timer counting subroutine in the step S5 will be described. As is shown in FIG. 5, the flag F_2 Hz is set to 0 or 1 in a cycle of 2 Hz.

Referring then to FIGS. 7–12, the processing executed in the step S12 as the "pop down warning" subroutine will be described in detail.

FIG. 7 shows an example, in which warning is performed using LEDs 38 and 39 incorporated in the finder. If the flag F_2 Hz is set to "1", the LEDs 38 and 39 are turned on, whereas if the flag F_2 Hz is set to "0", the LEDs 38 and 39 are turned off. Thus, the LEDs are turned on and off in a cycle of 2Hz to perform warning. (Steps S20–S22)

Figure 8:
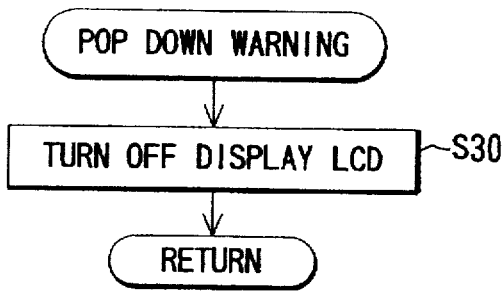
FIG. 8 is a flowchart, useful in explaining a sequence of "pop-down alarm" operation as another subroutine executed in a step S12 of FIG. 6.

FIG. 8 shows an example in which an LCD 22, i.e. an external liquid crystal display, is used as the warning means. In this case, the LCD 22 is turned off to perform warning (step S30).

Figure 9:
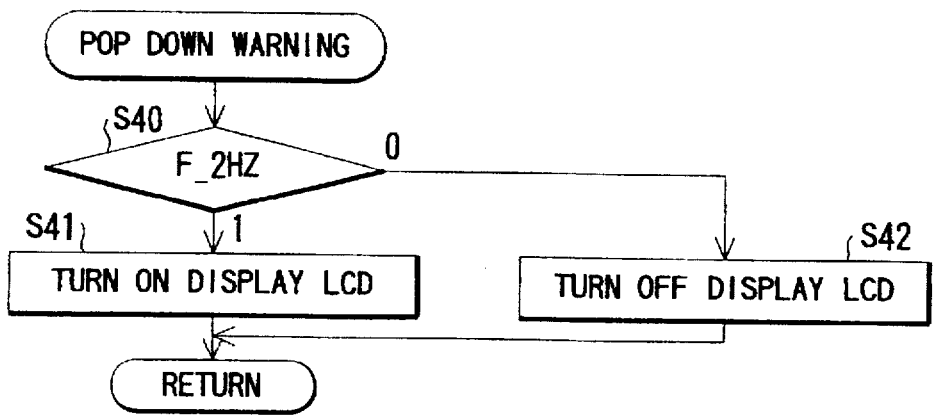
FIG. 9 is a flowchart, useful in explaining a sequence of "pop-down alarm" operation as a further subroutine executed in a step S12 of FIG. 6.

FIG. 9 shows an example, in which the LCD 22 is repeatedly turned on and off in synchronism with the flag F_2 Hz to perform warning (steps S40–S42).

FIG. 10 shows an example, in which the warning methods illustrated in FIGS. 7 and 8 are employed. Specifically, if the flag F_2 Hz is set to "1", the LEDs 38 and 39 incorporated in the finder are turned on, whereas if the flag F_2 Hz is set to "0", the LEDs 38 and 39 are turned off. Thus, the LEDs are turned on and off in the cycle of 2 Hz, and further the LCD 22 is kept off, to thereby perform warning (steps S50–S53).

FIG. 11 shows another example, in which the warning methods illustrated in FIGS. 7 and 8 are employed. Specifically, if the flag F_2 Hz is set to "1", the LEDs 38 and 39 incorporated in the finder are turned on and the external LCD is turned on, whereas if the flag F_2 Hz is set to "0", the LEDs 38 and 39 are turned off and also the LCD is turned off. Thus, the LEDs and the LCD 22 are turned on and off in the cycle of 2Hz, to thereby perform warning (steps S60–S64).

FIG. 12 shows an example, in which a voice member PCV 23 is used as the warning means. A voice is output from the PCV 23 to perform warning (step S70).

Although in the above-described embodiments, warning is performed using the LEDs 38 and 39 incorporated in the finder, the external LCD 22 or the voice member PVC 23, it is a matter of course that warning may be given to the photographer by prohibiting the release operation, i.e. the exposure operation.

As described above, even when the operator erroneously has pushed the strobe (flash) emission section, he can be quickly aware of his erroneous operation since he is warned of the erroneous operation, and further he can take a good photograph with good timing since the camera is returned to the photographing standby state immediately after the strobe emission section is returned to the emission-permitted position.

The invention can provide a strobe camera capable of taking a chance to have a clear photograph without a blur even when the strobe emission section has been pushed down erroneously.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. A strobe camera with a strobe emission section movable between a first position in which strobe light can be emitted and a second position different from the first position, comprising:

a strobe state detection unit for outputting a first strobe state signal when the strobe emission section is in the first position, and a second strobe state signal when the strobe emission section is in the second position;

a camera state detection unit for outputting a first camera state signal when the camera is in a photographing-permitted state, and a second camera state signal when the camera is in a photographing-prohibited position; and a control unit for causing the camera to execute a warning operation when the camera state detection unit outputs the first camera state signal and the strobe state detection unit outputs the second strobe state signal, and for causing the camera to stop execution of the warning operation and perform an exposure operation when the first strobe state signal is output instead of the second strobe state signal.

2. The strobe camera according to claim 1, wherein the strobe state detection unit includes a switch operable in response to a movement of the strobe emission section.

3. The strobe camera according to claim 1, wherein the strobe emission section can be electrically driven between the first and second positions, and manually pushed into a body of the camera for storage therein, and wherein the strobe state detection unit outputs the second strobe state signal when the strobe emission section is stored in the body of the camera.

4. The strobe camera according to claim 3, wherein the strobe emission section can be manually released from the body of the camera so as to protrude therefrom.

5. The strobe camera according to claim 1, wherein the camera state detection unit includes a detector for detecting a state of a switch for turning the camera on and off.

6. The strobe camera according to claim 1, wherein the camera state detection unit includes a detector for detecting a movement of a movable cover for protecting a photographing lens incorporated in the camera.

7. The strobe camera according to claim 1, further comprising a warning device for executing the warning operation under the control of the control unit, wherein the warning device includes at least one of a display device for performing a visual warning operation and a sound generator for performing an auditory warning operation.

8. The strobe camera according to claim 7, wherein the display device performs a turn-on and turn-off of light as the visual warning operation.

9. The strobe camera according to claim 7, wherein the display device comprises one of a display element provided on an enclosure section included in a body of the camera, and a display element provided in a finder incorporated in the camera.

10. The strobe camera according to claim 1, further comprising a release mechanism for outputting an instruction to execute an exposure operation, and wherein the warning device prevents execution of the exposure operation during execution of the warning operation.

11. A strobe camera with a strobe emission section movable between a position in which strobe light can be emitted and a storage position in which the strobe emission section is stored in a body of the camera, comprising:

a strobe state detection section for outputting a strobe storage state signal indicating that the strobe emission section is stored in the body of the camera when the strobe emission section is in the storage position, and for outputting an emission-permitted state signal when the strobe emission section is in an emission-permitted state;

a camera state detection section for outputting a photographing-permitted state signal when the camera is in a photographing-permitted state; and a control section for causing the camera to execute a warning operation when the camera state detection section outputs the photographing-permitted state signal and the strobe state detection section outputs the strobe storage state signal, and for causing the camera to stop execution of the warning operation and to perform an exposure operation when the strobe emission-permitted state signal is output instead of the strobe storage state signal.

12. A camera comprising:

an operation unit for setting the camera to an operable state;

a strobe unit for emitting illumination light onto a target;

a drive unit for moving at least an emission part incorporated in the strobe unit between a light emission position in which light can be emitted from the emission part and a storage position in which the emission part is stored in a body of the camera;

a detection unit for detecting whether or not the emission part is in the light emission position; and a microcomputer for processing data input from the operation unit and the detection unit to control the strobe unit and the drive unit, wherein the microcomputer prohibits execution of an exposure operation when the operation unit sets the camera to an operable state and the detection unit detects that the emission part is not in the light emission position, and permits execution of the exposure operation when the detection unit, after the exposure operation has been prohibited, detects that the emission part is in the light emission position.

13. The camera according to claim 12, wherein the operation unit includes a switch for turning on and off a power supply incorporated in the camera.

14. The camera according to claim 12, wherein the drive unit moves a frame of a photographing lens of the cameras and also moves the emission part in synchronism with the movement of the frame.

15. The camera according to claim 12, wherein the detection unit includes a switch which is turned on and off in accordance with the position of the emission part.

16. The camera according to claim 12, further comprising a warning unit for outputting a warning signal, wherein the microcomputer causes the warning unit to output the warning signal when prohibiting the exposure operation, and causes the warning unit to stop outputting the warning signal when ending prohibition of the exposure operation.

17. The camera according to claim 16, wherein the warning unit includes at least one of a display unit for performing a visual warning operation and a sound unit for performing an auditory warning operation.

* * * * *